United States Patent [19]
Lennon

[11] Patent Number: 5,524,575
[45] Date of Patent: Jun. 11, 1996

[54] ANIMAL GROOMING GLOVE HAVING A MITTBODY INCLUDING A MAIN POCKET AND A SEPARATE THUMB POCKET

[75] Inventor: Catherine M. Lennon, Chevron Island, Australia

[73] Assignee: Purebred Products Pty Ltd., Australia

[21] Appl. No.: 232,038

[22] PCT Filed: Jun. 7, 1993

[86] PCT No.: PCT/AU93/00273

§ 371 Date: Apr. 26, 1994

§ 102(e) Date: Apr. 26, 1994

[87] PCT Pub. No.: WO93/25069

PCT Pub. Date: Dec. 23, 1993

[30] Foreign Application Priority Data

Jun. 9, 1992 [AU] Australia ............... PL2839
Dec. 22, 1992 [AU] Australia ............... 30357/92

[51] Int. Cl.$^6$ ................................ A01K 13/00
[52] U.S. Cl. .................. 119/83; 119/626; 119/632; 15/246.2; 15/227
[58] Field of Search .............. 119/83, 85, 86; 15/227; 2/161.8

[56] References Cited

U.S. PATENT DOCUMENTS

| | | | |
|---|---|---|---|
| 1,346,683 | 7/1920 | Reynolds | 15/227 |
| 2,049,323 | 7/1936 | Schmidt | 15/227 |
| 2,187,430 | 1/1940 | Olmsted | 15/227 |
| 4,051,572 | 1/1977 | Greenwood | 15/227 |
| 4,249,521 | 2/1981 | Gueret | 15/227 |
| 4,308,860 | 1/1982 | Sanders et al. | 15/227 |
| 4,343,265 | 8/1982 | Belschner | |
| 4,926,796 | 5/1990 | Leopold | |
| 5,009,195 | 4/1991 | Damm | |

FOREIGN PATENT DOCUMENTS

| | | | |
|---|---|---|---|
| 904752 | 9/1986 | Belgium | |
| 9000599 | 10/1991 | Brazil | |
| 0381854A2 | 8/1990 | European Pat. Off. | |
| 0512695A1 | 11/1992 | European Pat. Off. | |
| 2614758 | 11/1988 | France | |
| 615842 | 7/1935 | Germany | |
| 031984 | 3/1984 | Germany | |
| 3507698 | 9/1986 | Germany | 119/83 |
| WO870406 | 7/1987 | WIPO | |

*Primary Examiner*—Todd E. Manahan
*Attorney, Agent, or Firm*—Lerner, David, Littenberg, Krumholz & Mentlik

[57] ABSTRACT

An animal grooming mitt is provided which has a mitt body including a main pocket and a separate thumb pocket, and a palm portion made of rubber which is attached to the mitt body and which has a sufficient coefficient of friction to facilitate the removal of an animal's hair during grooming of the animal upon movement of the animal grooming mitt through an animal's hair in a manner which resembles petting of the animal.

4 Claims, 3 Drawing Sheets

ANIMAL GROOMING GLOVE HAVING A MITTBODY INCLUDING A MAIN POCKET AND A SEPARATE THUMB POCKET

BACKGROUND OF THE INVENTION

1. Field of the Invention

THIS INVENTION relates to animal grooming aids.

2. Prior Art

One major problem with keeping pets, such as dogs and cats, is picking up the hair or fur (hereinafter called "hair") which they tend to shed onto furniture, the floors, clothing and the like. Even regular grooming with existing combs or brushes does not solve the problem as the combs or brushes do not remove the loose under-coat hair or fur as the fine fibers "slip" between the comb or brush teeth. (The very fine fur, if not removed, can result in fatal furballs in cats.)

The use of latex rubber in different products is known in various applications as follows:

(a) BE 904752—(Gillard) "discloses protective gloves with interchangeable accessories" where different accessories, e.g. (i) to wash dishes; (ii) scour a bathroom; (iii) to sand or polish furniture or a car body where gloves made of latex, rubber or other material "whose external surface exhibits a material for engaging and/or attaching any accessory". The gloves are designed to enable removable accessories to be fitted to the gloves, but there is no disclosure of the gloves per se being used to groom animals.

(b) WO87/04061—(McLeish et al) discloses no more than a method of manufacturing a glove or mitten of rubber or plastics material, including "bonding a cleaning article or a secondary attachment means to at least the front finger wear of said glove or mitten". Again, there is no disclosure of the glove or mitten as an animal grooming aid.

(c) DE 3232313—(Finke) discloses "a glove or mitten for oral-hygienic use" where different teeth and/or gum treatment devices (e.g. bristles, rubber naps, dental floss) are releasably securable to a finger position. "The operating space extends from the fingertip (Fingerbeere) through the Phalanx distalis (nail) and Phalanx media (middle part of the finger). The width of the operating area covers the inner side of the finger in this area and extends for approximately 5 mm along the interdigital sides (sides of the finger)". A device for oral hygiene does not disclose a pet grooming aid.

(d) BR PI9000599—(Loiola) is directed to a "practical and simple procedure for rubberizing of fabrics". "The process, performed cold, consists of applying a layer of latex, diluted in water and dried at room temperature, to both sides of the fabric. Application may be performed by means of a brush, rollers or immersion."

The rubberizing of fabric produced by the method has "utilization" for the manufacturing of inner tubes, balls, water beds, inflatable boats, tents and rucksacks.

There is no disclosure of the use of the rubberized fabric as an animal grooming aid

SUMMARY OF THE PRESENT INVENTION

It is an object of the present invention to provide at least one animal grooming aid where the finer hair or fur is easily removed from the animal's coat.

It is a preferred object to provide such an aid where the outer, thicker hair or fur will still be effectively groomed.

It is a further preferred object to provide such an aid which is inexpensive and easy to use.

Other preferred objects of the present invention will become apparent from the following description.

In one aspect, the present invention resides in an animal grooming comb or brush where the bristles or teeth have a coating of latex rubber or like soft rubber.

In a second aspect, the present invention resides in an animal grooming aid in the form of a glove or mitt, having in at least a palm region, a panel formed or faced with latex rubber or like soft rubber, optionally with an undulating surface, or bristles, or teeth.

In a third aspect, the present invention resides in an animal grooming aid attachable to, or formed integrally with, a cleaning head of a vacuum cleaner, the aid comprising a panel of latex rubber or like soft rubber covering the cleaning face of the head and having a substantially central suction passage therethrough.

It is observed that the latex rubber has a high co-efficient of friction with the soft, fine undercoat hairs on dogs, and the fur on cats, so it does not "slip" through between the teeth as easily as with uncoated plastic or wire teeth or bristles, and so the loose hair or fur is removed.

It is preferred that the teeth or bristles have at least a semi-rigid core, coated by the latex rubber, to provide sufficient rigidity to the teeth or bristles, to enable the hair or fur to be removed from the animal's coat, latex rubber having insufficient mechanical strength to be used solely for the teeth or bristles.

BRIEF DESCRIPTION OF THE DRAWINGS

To enable the invention to be fully understood, a number of preferred embodiments will now be described with reference to the accompanying drawings, in which.

DETAILED DESCRIPTION OF THE PREFERRED EMBODIMENTS

Figure 1:
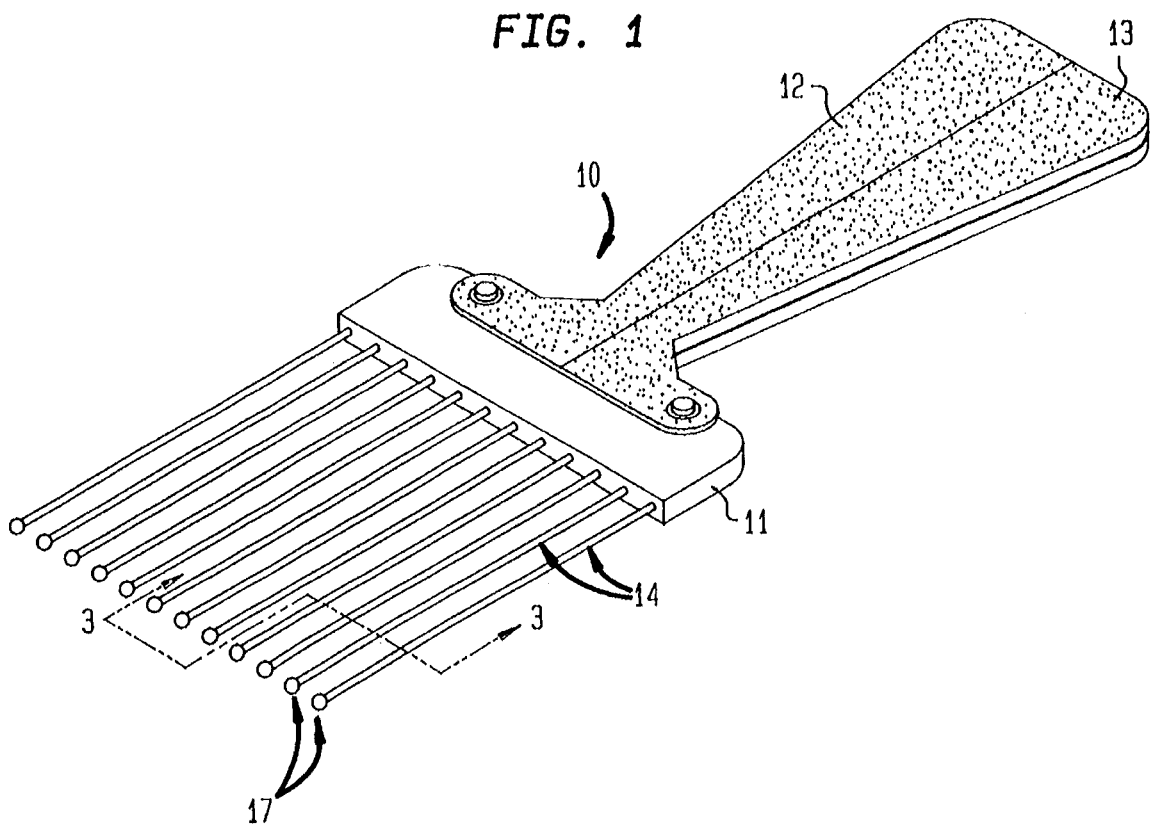
FIG. 1 is a perspective view of a first animal grooming comb in accordance with the present invention.

Referring to FIG. 1, the comb 10 has a body 11 with a pair of foldable handles 12, 13.

The teeth 14 of the comb 10 are relatively widely spaced to enable the comb to be used to groom longer-haired dogs, eg. Golden Retrievers.

Figure 3:
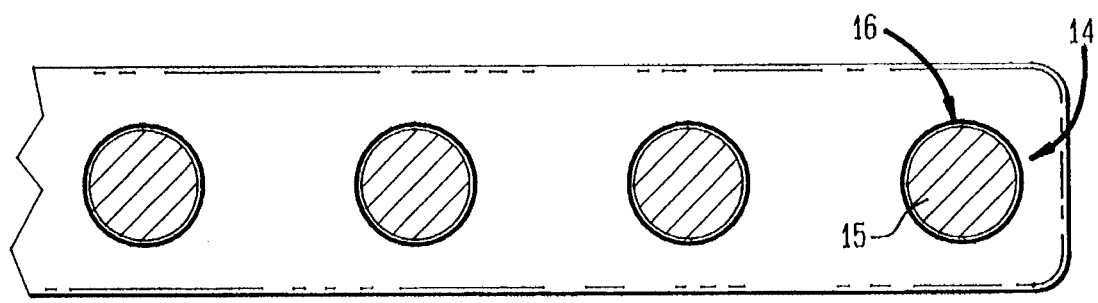
FIG. 3 is a sectional end view taken on line 3—3 on FIG. 1.

As shown in FIG. 3, each tooth 14 has a spine 15 of at least semi-rigid steel or plastic wire surrounded by a layer of latex rubber 16 (or other suitable soft (or unvulcanised) rubber).

Figure 5A:
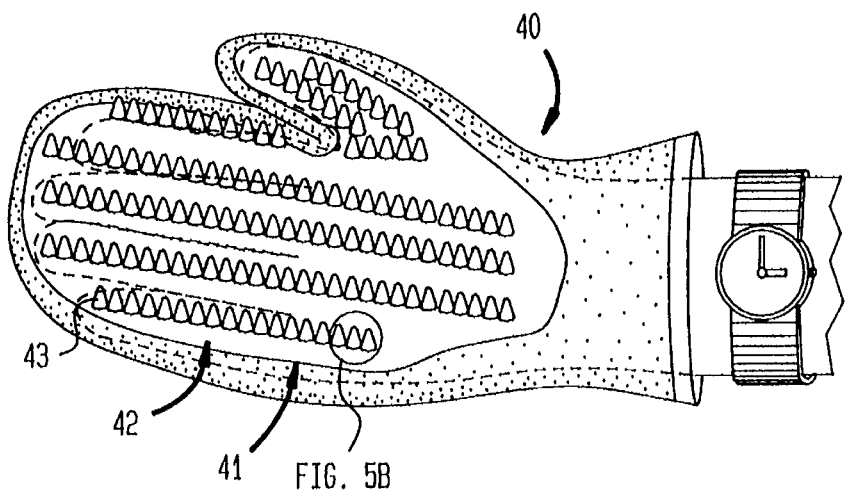
FIG. 5A is a perspective view of a pet grooming mitt.
Figure 5B:
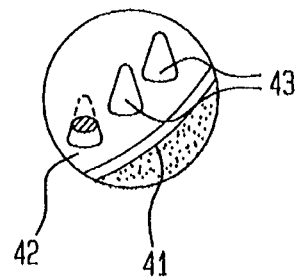
FIG. 5B is an enlarged view of an area on the palm portion of the pet grooming mitt showing a cross-sectional view across one of the projections thereof.

As indicated above, the mitt 40 shown in FIGS. 5A and 5B may include projections, teeth or bristles having a semi-rigid core coated by rubber, to provide sufficient rigidity to the projections, teeth or bristles which will facilitate removal of an animal's hair or fur during grooming procedures.

Figure 4:
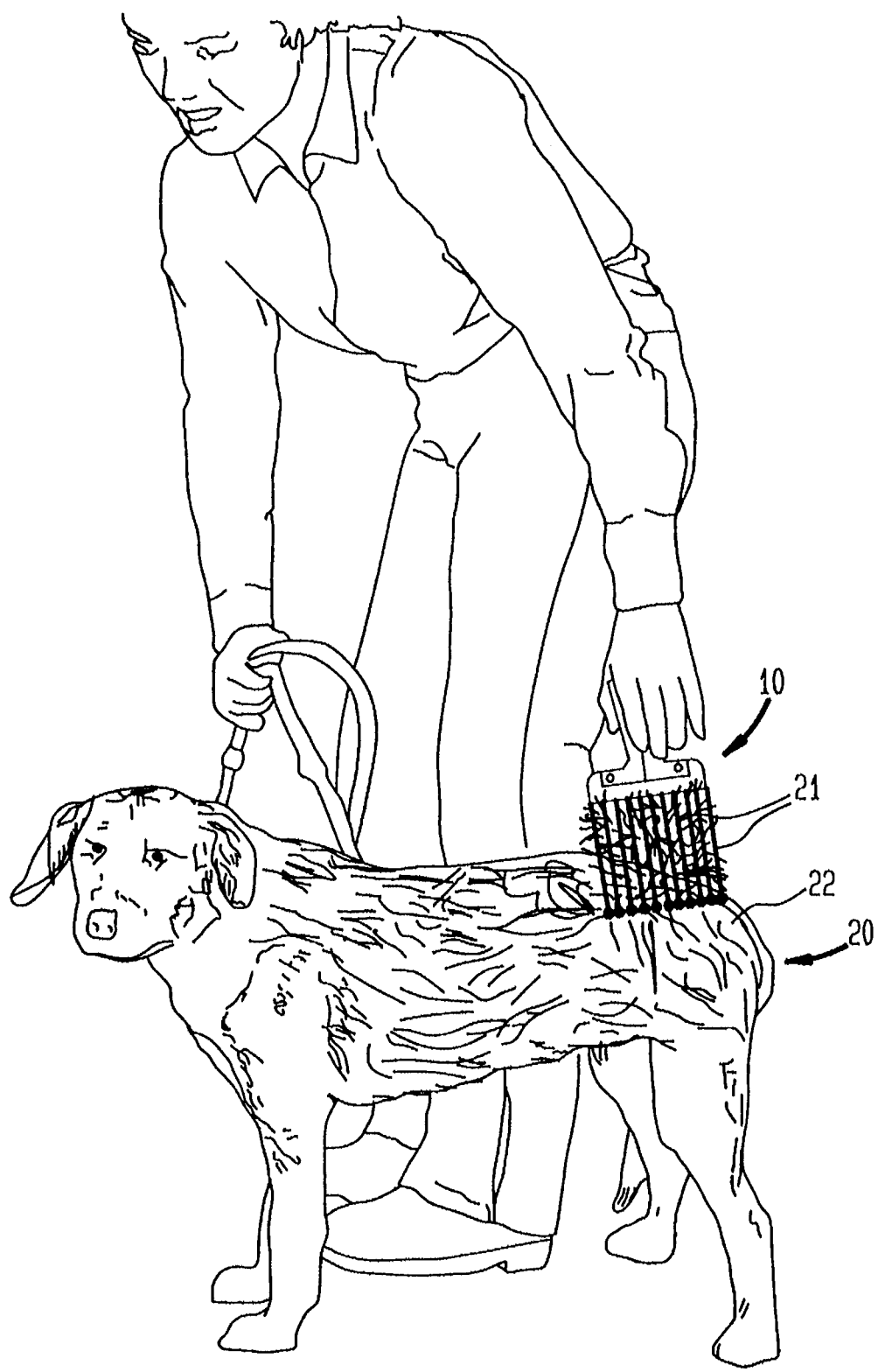
FIG. 4 is a perspective view of a dog being groomed with the comb of FIG. 1.

The latex rubber layer 16 does not, on close inspection, have a smooth surface, and it appears to be the combination of the rough surface and compressibility of the rubber which generates a higher co-efficient or friction between the teeth 14 and the fine under-hair 21 of the dog 20 (see FIG. 4).

The teeth 14 of the comb 10 pass through the outer hair 22 without undue drag but pick up the loose underhair 21 which is the major nuisance when a dog moults or sheds its coat.

To enable the teeth 14 of the comb 10 to more freely pass over the dog's skin, and to prevent undue wear of the latex rubber layer 16 at the tips of the teeth, small spheres of plastic 17 may be provided on the tips of the teeth 14.

Figure 2:
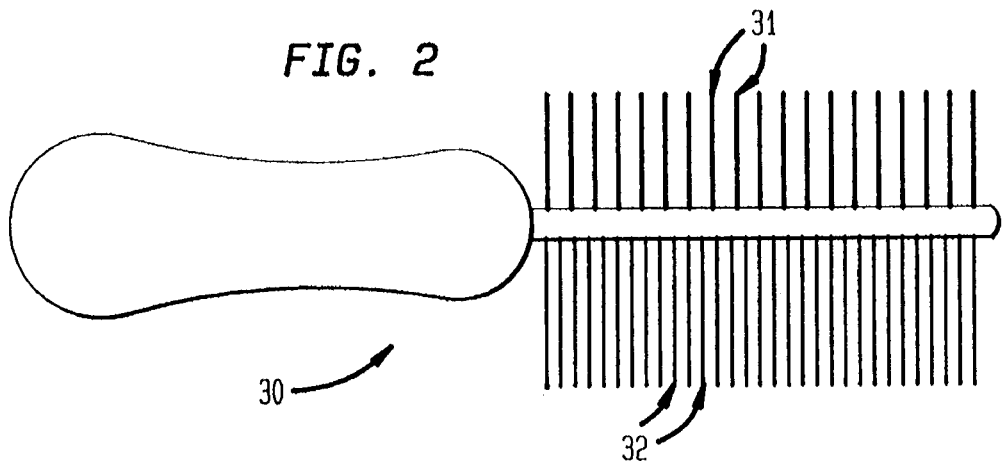
FIG. 2 is a similar view of a second comb.

Referring to FIG. 2, the comb 30 has teeth 31, 32 at different spacings along the comb body 33 and the teeth 31, 32 have a construction as described with reference to, and as illustrated in, FIG. 3. This comb 30 may be used on fine or shorter haired dogs or on cats.

As an alternative to combs 10, 30, brushes (not shown) may have bristles coated with the latex rubber 16.

As a further alternative, a glove or mitt 40 (see FIG. 5) may be used. (In a simple form, a band, having a palm portion with strips or side bands and secured, eg. by the Velcro (trade mark), may be used.) The palm portion 41 is formed of, or faced by, latex or other soft rubber 42 and may have short fingers, teeth 43, bristles or undulations (eg. ridges and valleys) which, when the glove or mitt 40 is passed over or through the animal's coat, will pull free any loose hairs or fur therein.

Figure 6:
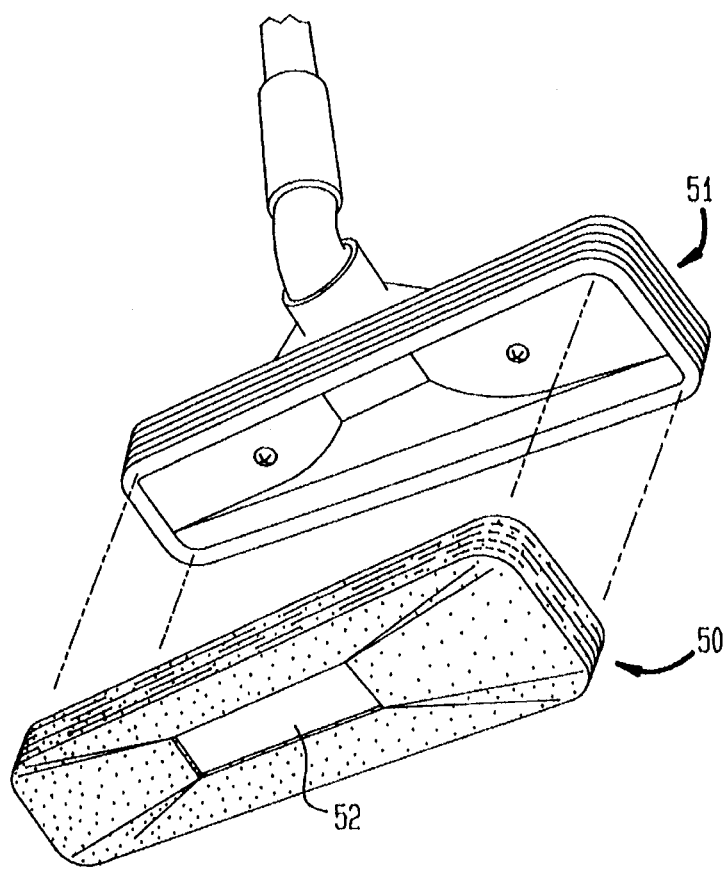
FIG. 6 is a perspective view of a pet grooming attachment for a vacuum cleaner.

To enable animal hair to be removed, eg. from carpets or furniture, an attachment 50 (see FIG. 6) is moulded of latex rubber and fits onto the cleaning head 51 of a vacuum cleaner (not shown), the attachment 50 having an integral clip means to releasably secure it to the cleaning head. A central suction passage 52 allows the hair to be sucked into the cleaning head 51 once it has been loosened from the carpet or furniture.

It will be readily apparent to the skilled addressee that the present invention provides simple, inexpensive, and efficient animal .grooming aids, where the unwanted loose fine hair or fur can be easily removed from an animal's coat.

Various changes and modifications may be made to the embodiments described without departing from the scope of the present invention defined in the appended claims.

I claim:

1. An animal grooming mitt comprising: a mitt body made of a first material, said mitt body having a main pocket and a separate thumb pocket; and a palm portion made of rubber which is different than said first material, said palm portion including a plurality of rubber projections extending away from said mitt body, said rubber projections having a sufficient coefficient of friction to facilitate the removal of an animal's hair during grooming upon movement of said plurality of projections through the animal's hair in a manner resembling petting of the animal.

2. The animal grooming mitt of claim 1 wherein said plurality of rubber projections include an internal portion and an external portion, said internal portion including a substantially rigid material.

3. The animal grooming mitt of 2 wherein said substantially rigid material of said internal portion includes steel.

4. The animal grooming mitt of claim 2 wherein said substantially rigid material of said internal portion includes plastic.

* * * * *

UNITED STATES PATENT AND TRADEMARK OFFICE
CERTIFICATE OF CORRECTION

PATENT NO. : 5,524,575

DATED : June 11, 1996

INVENTOR(S) : Lennon

It is certified that error appears in the above-identified patent and that said Letters Patent is hereby corrected as shown below:

Column 2, line 62, cancel "As indicated above, the mitt 40 shown in FIGS. 5A and 5B may include projections, teeth or bristles having a semi-rigid core coated by rubber, to provide sufficient rigidity to the projections, teeth or bristles which will facilitate removal of an animal's hair or fur during grooming procedures."

Column 3, line 30, after "or fur therein" insert a new paragraph --As indicated above, the mitt 40 shown in FIGS. 5A and 5B may include projections, teeth or bristles having a semi-rigid core coated by rubber, to provide sufficient rigidity to the projections, teeth or bristles which will facilitate removal of an animal's hair or fur during grooming procedures.--

Signed and Sealed this

Twenty-fourth Day of September, 1996

BRUCE LEHMAN

*Attest:*

*Attesting Officer*    *Commissioner of Patents and Trademarks*